United States Patent
Huang et al.

(10) Patent No.: US 12,094,047 B2
(45) Date of Patent: *Sep. 17, 2024

(54) ANIMATED EMOTICON GENERATION METHOD, COMPUTER-READABLE STORAGE MEDIUM, AND COMPUTER DEVICE

(71) Applicant: TENCENT TECHNOLOGY (SHENZHEN) COMPANY LTD, Guangdong (CN)

(72) Inventors: Dong Huang, Shenzhen (CN); Tian Yi Liang, Shenzhen (CN); Jia Wen Zhong, Shenzhen (CN); Jun Jie Zhou, Shenzhen (CN); Jin Jiang, Shenzhen (CN); Ying Qi, Shenzhen (CN); Si Kun Liang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,742

(22) Filed: Mar. 23, 2023

(65) Prior Publication Data

US 2023/0230306 A1 Jul. 20, 2023

Related U.S. Application Data

(63) Continuation of application No. 17/047,276, filed as application No. PCT/CN2019/104988 on Sep. 9, 2019, now Pat. No. 11,645,804.

(30) Foreign Application Priority Data

Sep. 27, 2018 (CN) .......................... 201811132844.6

(51) Int. Cl.
*G06T 13/80* (2011.01)
*G06F 3/04817* (2022.01)
(Continued)

(52) U.S. Cl.
CPC .......... *G06T 13/80* (2013.01); *G06F 3/04817* (2013.01); *G06F 3/0483* (2013.01);
(Continued)

(58) Field of Classification Search
CPC ..... G06T 13/80; G06T 13/40; G06T 2200/24; G06V 40/171; G06F 3/04817;
(Continued)

(56) References Cited

U.S. PATENT DOCUMENTS 6,232,965 B1 * 5/2001 Scott ....................... G06T 13/40
704/E21.02
2005/0163379 A1 7/2005 Zimmermann
(Continued)

FOREIGN PATENT DOCUMENTS

CN 101179471 A 5/2008
CN 101179688 A 5/2008
(Continued)

OTHER PUBLICATIONS

China office action for Chinese Application 201811132844.6 dated Jul. 29, 2019.
(Continued)

*Primary Examiner* — Jin Ge
(74) *Attorney, Agent, or Firm* — Sughrue Mion, PLLC

(57) ABSTRACT

An animated emoticon generation method, a computer-readable storage medium, and a computer device are provided. The method includes: displaying an emoticon input panel on a chat page; detecting whether a video shooting event is triggered in the emoticon input panel; acquiring video data in response to detecting the video shooting event;
(Continued)

obtaining an edit operation for the video data; processing video frames in the video data according to the edit operation to synthesize an animated emoticon; and adding an emoticon thumbnail corresponding to the animated emoticon to the emoticon input panel, the emoticon thumbnail displaying the animated emoticon to be used as a message on the chat page based on a user selecting the emoticon thumbnail in the emoticon input panel.

20 Claims, 10 Drawing Sheets

(51) Int. Cl.
| | |
|---|---|
| *G06F 3/0483* | (2013.01) |
| *G06T 13/40* | (2011.01) |
| *G06V 40/16* | (2022.01) |
| *G11B 27/022* | (2006.01) |
| *H04L 51/10* | (2022.01) |
| *H04N 5/262* | (2006.01) |

(52) U.S. Cl.
CPC ............ *G06T 13/40* (2013.01); *G06V 40/171* (2022.01); *G11B 27/022* (2013.01); *H04L 51/10* (2013.01); *H04N 5/2621* (2013.01); *G06T 2200/24* (2013.01)

(58) Field of Classification Search
CPC ..... G06F 3/0483; G11B 27/022; H04L 51/10; H04N 5/2621
USPC ........................................................ 345/473
See application file for complete search history.

(56) References Cited

U.S. PATENT DOCUMENTS

| | | |
|---|---|---|
| 2011/0176010 A1 | 7/2011 | Houjou et al. |
| 2012/0256928 A1 | 10/2012 | Chiculita |
| 2013/0147933 A1 | 6/2013 | Kulas |
| 2014/0092101 A1* | 4/2014 | Lee ........................ G06T 13/80 345/473 |
| 2015/0006657 A1 | 1/2015 | Zhang et al. |
| 2015/0052462 A1* | 2/2015 | Kulkarni ............. G06F 3/04817 715/765 |
| 2016/0358366 A1* | 12/2016 | Wang ....................... G06T 13/00 |
| 2017/0024087 A1* | 1/2017 | Pathy ...................... G06T 13/80 |
| 2017/0054663 A1* | 2/2017 | Geiger .................... H04L 51/10 |
| 2018/0108111 A1 | 4/2018 | Zhu |
| 2018/0121065 A1* | 5/2018 | Seo .......................... G06F 9/451 |
| 2018/0143761 A1* | 5/2018 | Choi ...................... G06F 3/0482 |
| 2020/0051307 A1* | 2/2020 | Kim ........................ G06T 13/80 |

FOREIGN PATENT DOCUMENTS

| | | |
|---|---|---|
| CN | 104333688 A | 2/2015 |
| CN | 104917666 A | 9/2015 |
| CN | 106255989 A | 12/2016 |
| CN | 106658079 A | 5/2017 |
| CN | 107240143 A | 10/2017 |
| CN | 107370887 A | 11/2017 |
| CN | 108573527 A | 9/2018 |
| CN | 109120866 A | 1/2019 |
| EP | 3324606 A1 | 5/2018 |
| JP | 2004-72685 A | 3/2004 |
| JP | 2013-165462 A | 8/2013 |

OTHER PUBLICATIONS

China office action for Chinese Application 201811132844.6 dated Oct. 23, 2019.
Communication dated Apr. 19, 2021, from the European Patent Office in European Application No. 19864211.8.
Communication dated May 7, 2021, from the European Patent Office in European Application No. 19864211.8.
International search report for PCT/CN2019/104988 dated Nov. 28, 2019.
Notice of Reasons for Refusal dated Dec. 21, 2021 from the Japanese Patent Office in JP Application No. 2020-552389.
Written Opinion dated Nov. 28, 2019 from the International Bureau in International Application No. PCT/CN2019/104988.

* cited by examiner

ANIMATED EMOTICON GENERATION METHOD, COMPUTER-READABLE STORAGE MEDIUM, AND COMPUTER DEVICE

CROSS-REFERENCE TO RELATED APPLICATION(S)

This is a Continuation Application of U.S. patent application Ser. No. 17/047,276, filed Oct. 13, 2020, which claims priority from PCT/CN2019/104988, filed on Sep. 9, 2019, and claims priority to Chinese Patent Application No. 201811132844.6, entitled "DYNAMIC EMOTICON-GENERATING METHOD, COMPUTER-READABLE STORAGE MEDIUM AND COMPUTER DEVICE," filed with the China National Intellectual Property Administration on Sep. 27, 2018, the disclosures of which are incorporated by reference herein in their entireties.

BACKGROUND

1. Field

Embodiments of the disclosure relate to the field of computer technologies, and in particular, to an animated emoticon generation method, a computer-readable storage medium, and a computer device.

2. Description of Related Art

With the rapid development of the Internet, various online social applications have emerged, including instant messaging applications and the like. In social application platforms, users send animated emoticons to express themselves more vividly to achieve more flexible and interesting communication between the users.

Currently, many animated emoticons are usually pre-designed by developers of social applications, and users can download or save the animated emoticons for use. These animated emoticons are not personalized content of the users. To use a customized animated emoticon, a user first needs to acquire and use an additional tool to process images that the user wants to generate in an animated emoticon and then import the animated emoticon into a social application for convenient use. However, this manner of generating an animated emoticon is inconvenient for the users and time consuming.

SUMMARY

According to various embodiments of the disclosure, an animated emoticon generation method, a computer-readable storage medium, and a computer device are provided to resolve a technical problem of low efficiency in the related art.

According to an embodiment, there is provided an animated emoticon generation method, performed by a computer device, the method including: displaying an emoticon input panel on a chat page; detecting whether a video shooting event is triggered in the emoticon input panel; acquiring video data in response to detecting the video shooting event; obtaining an edit operation for the video data; processing video frames in the video data according to the edit operation to synthesize an animated emoticon; and adding an emoticon thumbnail corresponding to the animated emoticon to the emoticon input panel, the emoticon thumbnail displaying the animated emoticon to be used as a message on the chat page based on a user selecting the emoticon thumbnail in the emoticon input panel.

According to an embodiment, there is provided a computer device for generating an animated emoticon, including: at least one memory configured to store computer program code; at least one processor configured to access the at least one memory and operate as instructed by the computer program code. The computer program code includes: detection code configured to cause the at least one processor to display an emoticon input panel on a chat page and detect whether a video shooting event is triggered in the emotion input panel; acquisition code configured to cause the at least one processor to acquire video data in response to detecting the video shooting event; obtaining code configured to cause the at least one processor to obtain an edit operation for the video data; synthesis code configured to cause the at least one processor to process video frames in the video data according to the edit operation to synthesize an animated emoticon; and addition code configured to cause the at least one processor to add an emoticon thumbnail corresponding to the animated emoticon to the emoticon input panel, the emoticon thumbnail displaying the animated emoticon to be used as a message on the chat page based on a user selecting the emoticon thumbnail in the emoticon input panel.

According to an embodiment, there is provided a non-transitory computer-readable storage medium storing computer program code to cause at least one processor to: display an emoticon input panel on a chat page; detect whether a video shooting event is triggered in the emoticon input panel; acquire video data in response to detecting the video shooting event; obtain an edit operation for the video data; process video frames in the video data according to the edit operation to synthesize an animated emoticon; and add an emoticon thumbnail corresponding to the animated emoticon to the emoticon input panel, the emoticon thumbnail displaying the animated emoticon to be used as a message on the chat page based on a user selecting the emoticon thumbnail in the emoticon input panel.

Additional aspects, features and advantages of the disclosure will become more apparent from the following description taken in conjunction with the accompanying drawings.

DESCRIPTION

To make the objectives, technical solutions, and advantages of the disclosure clearer, the following description further describes the embodiments in detail with reference to the accompanying drawings. It should be understood that the specific embodiments described herein are merely examples used to explain the disclosure, and are not intended to limit the scope of the disclosure.

Figure 1:
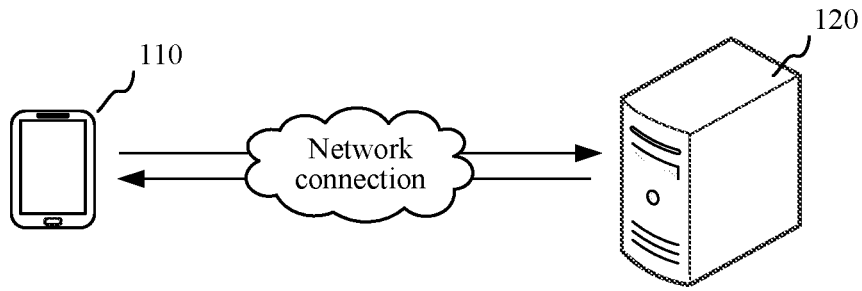
FIG. 1 is a diagram of an application environment of an animated emoticon generation method according to an embodiment.

FIG. 1 is a diagram of an application environment of an animated emoticon generation method according to an embodiment. Referring to FIG. 1, the animated emoticon generation method is applied to an animated emoticon generation system. The animated emoticon generation system includes a terminal 110 and a server 120. The terminal 110 is connected to the server 120 by a network. The terminal 110 may be a mobile terminal. The mobile terminal may include a mobile phone, a tablet computer, a notebook computer, and the like. The server 120 may be implemented by an independent server or a server cluster that includes a plurality of servers.

The terminal 110 may display an emoticon input panel on a chat page, detect a video shooting event triggered in the emoticon input panel, and acquire video data in response to the video shooting event. The terminal 110 may further obtain an edit operation for the video data, and process video frames in the video data according to the edit operation to synthesize an animated emoticon. The terminal 110 may further add an emoticon thumbnail corresponding to the animated emoticon to the emoticon input panel, the emoticon thumbnail being used for displaying the animated emoticon as a chat message on the chat page in a case that a selection event for the emoticon thumbnail is detected in the emoticon input panel.

The foregoing embodiment is merely an example. In some embodiments, the terminal 110 may further transmit the acquired video data and the obtained edit operation for the video data to the server 120. The server 120 processes video frames in the video data according to the edit operation to synthesize the animated emoticon, and transmits, to the terminal, the emoticon thumbnail corresponding to the synthesized animated emoticon to the terminal 110. The terminal 110 adds the emoticon thumbnail to the emoticon input panel, so that when detecting a trigger operation for the emoticon thumbnail in the emoticon input panel, the terminal 110 may pull the animated emoticon corresponding to the emoticon thumbnail from the server 120, and display the animated emoticon as a chat message on the chat page.

Figure 2:
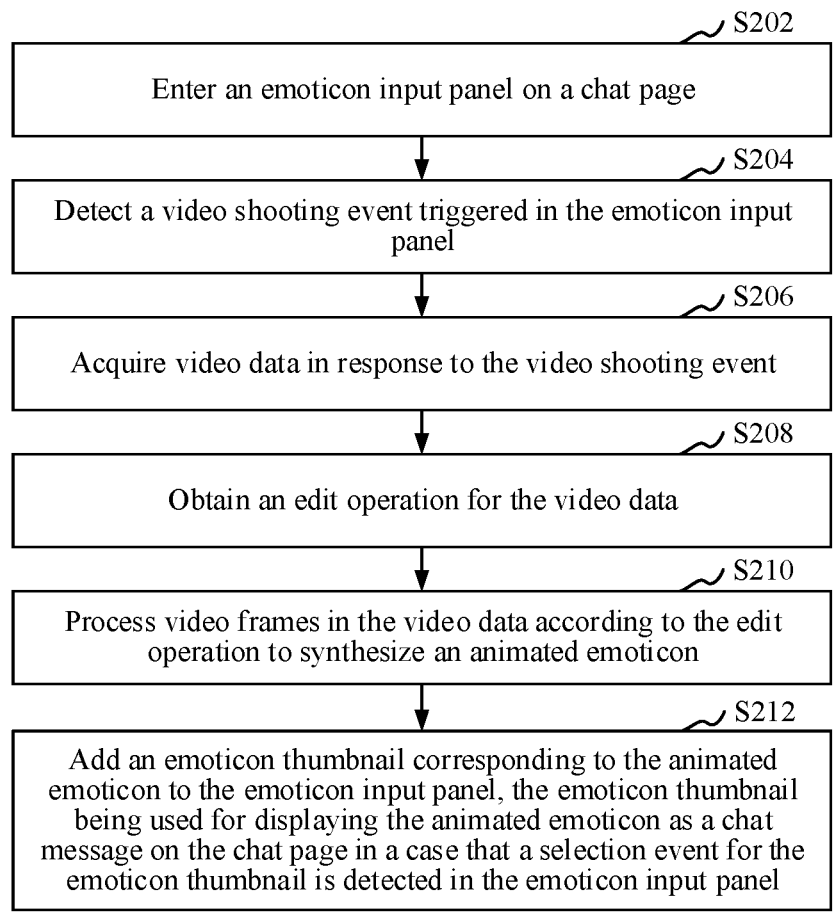
FIG. 2 is a flowchart of an animated emoticon generation method according to an embodiment.

As shown in FIG. 2, in an embodiment, an animated emoticon generation method is provided. The method is applied to a computer device. In this embodiment, descriptions are provided mainly by using an example in which the method is applied to the terminal 110 in FIG. 1. Referring to FIG. 2, the animated emoticon generation method specifically includes the following steps:

S202: Enter an emoticon input panel on a chat page.

The chat page is a page for displaying a chat message. The chat page may be, for example, a page that is in a social application and is used for displaying chat messages sent by both sides of a chat. The social application is an application for online interaction based on a social network, and usually has an instant messaging function. The social application may be an instant messaging application or the like. The chat message may be an instant chat message.

An emoticon is an image having an expression function, and can reflect a mental state, a mood, a feeling or a specific meaning of the user sending the emoticon. The emoticon includes a static emoticon and an animated emoticon. Generally, the static emoticon is a static picture frame, and may be in a file format of Portable Network Graphics (PNG). The animated emoticon is an animation and is synthesized by a plurality of picture frames, and may be in a file format of a Graphics Interchange Format (GIF).

The emoticon input panel is a container storing emoticon thumbnails corresponding to emoticons. A user may add a new emoticon to the emoticon input panel. The emoticon input panel may further include a plurality of tabs for containing emoticon thumbnails corresponding to emoticons of different categories or different sources. For example, a Common tab for containing an emoticon thumbnail corresponding to an emoticon designed by a developer of a social application, a Favorites tab for containing an emoticon thumbnail corresponding to an emoticon favored by a user, and an Add tab for downloading, saving, or importing a new emoticon. The emoticon input panel and a text input panel may be repeatedly switched on the chat page. When switching to the text input pane, the user may input a text in a text input box and send a text message to the other communication party, and when switching to the emoticon input panel, input an emoticon to send an emoticon message to the other communication party. The emoticon input panel and the text input panel may be generally referred to as a chat panel.

Specifically, the terminal may display an emoticon input icon on the chat page, and when detecting a trigger event for the emoticon input icon, the terminal displays the emoticon input panel on the chat page and enters the emoticon input panel. When detecting a trigger operation triggered by a user for any emoticon thumbnail in the emoticon input panel, the terminal may obtain an emoticon corresponding to the emoticon thumbnail, send the obtained emoticon to another terminal that logs in to a login account of the other communication party, and display the obtained emoticon on a current chat page. In this embodiment, the trigger operation for the emoticon thumbnail may be a tap operation, a pressing operation, a moving operation, a swipe operation or the like.

Figure 3:
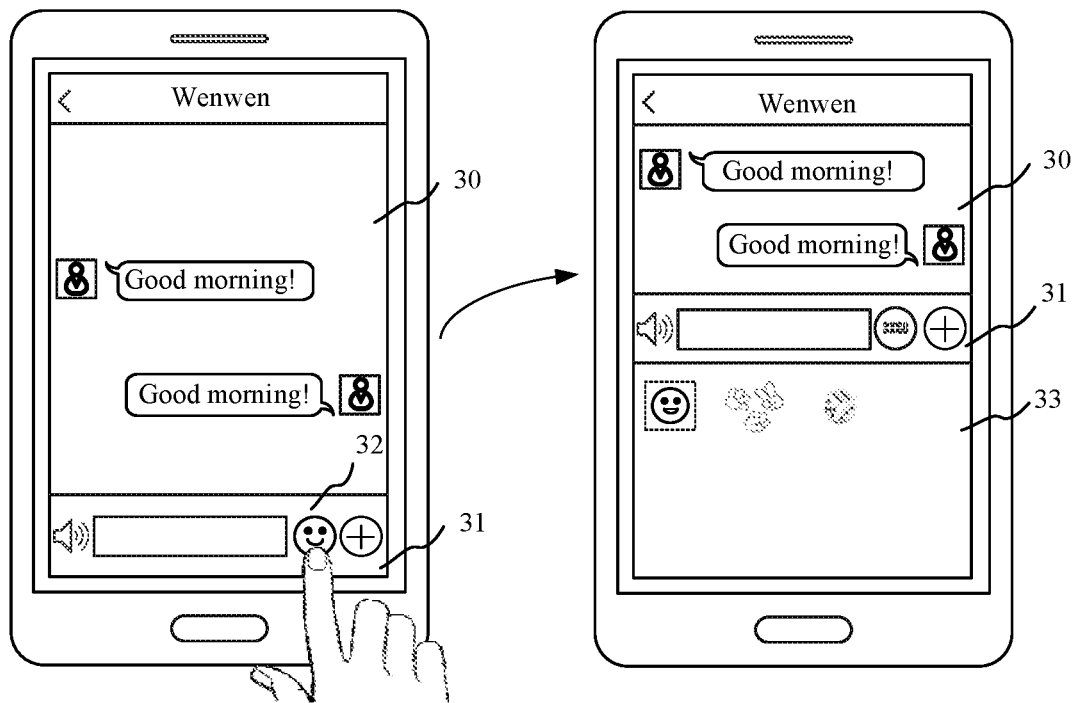
FIG. 3 is a schematic diagram of an interface in which an emoticon input panel is displayed on a session page according to an embodiment.

FIG. 3 is a schematic diagram of displaying an emoticon input panel on a chat page according to an embodiment. Referring to FIG. 3, the terminal may display an input box 31 on a chat page 30, and when detecting a trigger operation for an emoticon input icon 32 in the input box 31, the terminal may display an emoticon input panel 33 on the chat page 30.

S204: Detect a video shooting event triggered in the emoticon input panel.

The video shooting event is an event triggering video shooting. Specifically, the emoticon input panel includes both emoticon thumbnails corresponding to emoticons and an emoticon shooting icon. The terminal may detect a video shooting event triggered by a user for the emoticon shooting icon. The video shooting event triggered by the user for the emoticon shooting icon may be the video shooting event triggered in the emoticon input panel. The video shooting event may be a tap operation for the emoticon shooting icon.

In an embodiment, the emoticon input panel may include a plurality of tabs. The terminal may display the emoticon shooting icon on any one of the plurality of tabs, so that the video shooting event for the emoticon shooting icon may be detected on the tab. Alternatively, the terminal may display the emoticon shooting icon on all the tabs, so that the terminal may detect the video shooting event for the emoticon shooting icon triggered on any tab.

Figure 4:
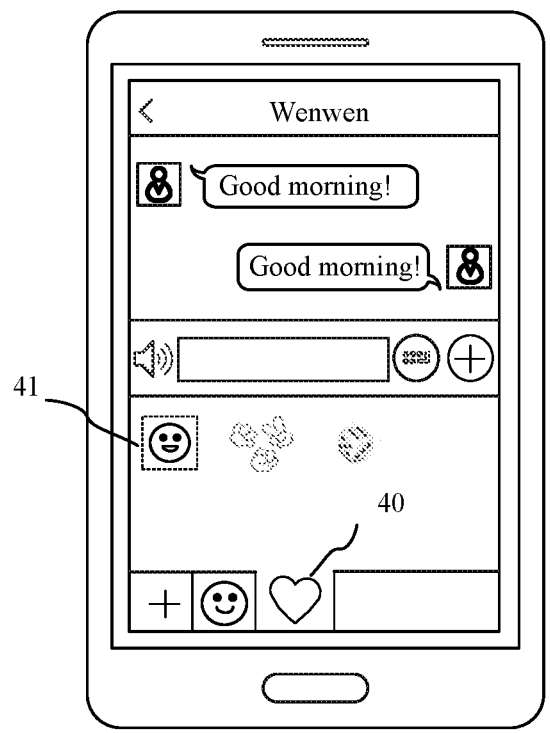
FIG. 4 is a schematic diagram of an interface in which an emoticon shooting icon is displayed on a Favorites tab of an emoticon input panel according to an embodiment.

FIG. 4 is a schematic diagram of displaying an emoticon shooting icon on a Favorites tab of an emoticon input panel according to an embodiment. Referring to FIG. 4, the user may tap an emoticon shooting icon 41 when entering a Favorites tab 40 in the emoticon input panel to trigger the shooting of video data.

S206: Acquire video data in response to the video shooting event.

The video data may be used to generate an animated emoticon, and the video data includes a plurality of acquired video frames. Specifically, when detecting the video shooting event triggered in the emoticon input panel, the terminal may control a specific acquisition apparatus to acquire the video data in response to the video shooting event. The acquisition apparatus may be, for example, a front-facing camera or a rear-facing camera configured on the terminal.

In an embodiment, the terminal may switch or jump from the chat page to a video acquisition page when detecting the video shooting event, directly invoke the acquisition apparatus on the video acquisition page to start acquiring the video data, and display the acquired video data on the video acquisition page until the acquisition is completed. The terminal may end the acquisition when detecting an acquisition end event triggered by the user, to obtain the video data.

In an embodiment, step S206 of acquiring video data in response to the video shooting event includes: switching or jumping from the chat page to a video acquisition page in response to the video shooting event; displaying, on the video acquisition page, a picture acquired in real time; starting to record the video data in a case that a recording start event triggered on the video acquisition page is detected; and obtaining the recorded video data until a recording end event is triggered on the video acquisition page.

The recording start event may be a trigger event triggered by the user for recording an icon. For example, the recording start event may include an event such as a pressing operation, a click/tap operation, or a sliding operation for recording an icon. The recording end event may be an event that a state of the recording icon switches from a pressed state to a non-pressed state, or may be an event that a recording duration of recording the video data reaches a target duration.

Specifically, the terminal may display, on the video acquisition page, the picture acquired in real time. For example, the user may acquire a real-time picture including the face of the user by using a front-facing camera configured on the terminal, or may acquire the real-time picture including the face of the user or others by using a configured rear-facing camera. The video data starts to be recorded when the recording start event triggered on the video acquisition page is detected, and the recorded video data is obtained until the recording end event is detected on the video acquisition page.

Figure 5:
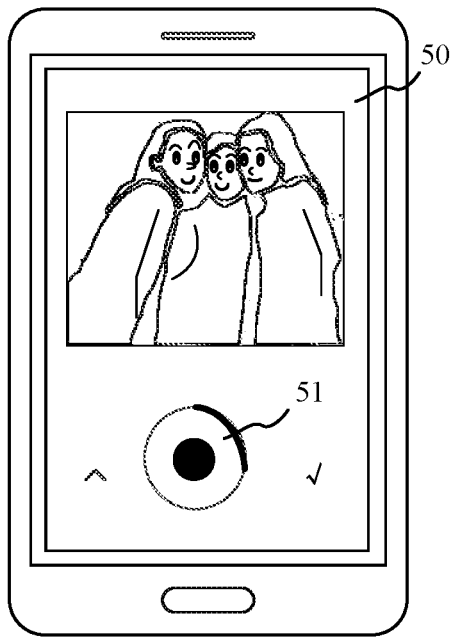
FIG. 5 is a schematic diagram of an interface of a video acquisition page according to an embodiment.

FIG. 5 is a schematic diagram of an interface of a video acquisition page according to an embodiment. Referring to FIG. 5, the user may long-press a recording icon 51 on a video acquisition page 50 to trigger the recording of video data, and obtain the recorded video data when the pressing ends or when the duration of recording the video data reaches target duration. The target duration may be, for example, 5 seconds to 10 seconds.

Figure 6:
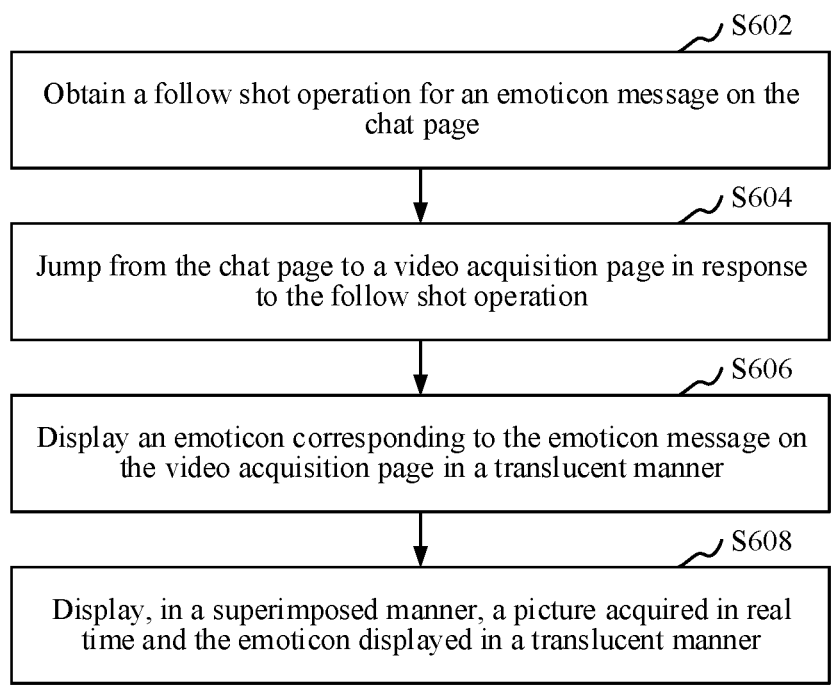
FIG. 6 is a flowchart of a step of performing a follow shot on an emoticon message on a chat page according to an embodiment.

As shown in FIG. 6, in an embodiment, the animated emoticon generation method further includes the following steps:

S602: Obtain a follow shot operation for an emoticon message on the chat page.

The emoticon message is a chat message using an emoticon as content. The follow shot operation is also a video shooting event triggered by the user. The user may trigger the video shooting event in the emoticon input panel or trigger the video shooting event by using the emoticon message.

Specifically, for the emoticon message displayed on the chat page, the terminal may detect a follow shot operation triggered by the user for the emoticon message to trigger acquisition of the video data. Based on detecting the follow shot operation, the user may perform an edit operation for the video data. The video frames in the video data may be processed according to the edit operation to synthesize an animated emoticon, and the synthesized animated emoticon may be added to an emoticon thumbnail of the emoticon input panel.

In an embodiment, when detecting a pressing operation for an emoticon in any emoticon message on the chat page, the terminal may display a details menu corresponding to the emoticon, detect a trigger operation triggered by the user for a "follow shot" option in the details menu, and obtain a follow shot operation for the emoticon message.

S604: Jump from the chat page to a video acquisition page in response to the follow shot operation.

Specifically, after detecting the follow shot operation for the emoticon message, the terminal may change or switch from the chat page to the video acquisition page, and display, on the video acquisition page, a picture acquired in real time.

S606: Display an emoticon corresponding to the emoticon message on the video acquisition page in a translucent manner.

S608: Display, in a superimposed manner, a picture acquired in real time and the emoticon displayed in a translucent manner.

The terminal may display, on the video acquisition page in a translucent manner, the emoticon corresponding to the emoticon message as the foreground of the picture acquired in real time. As such, the acquired picture and the translucent emoticon may be displayed on the video acquisition page in a superimposed manner, thereby guiding the recording of video data for the picture acquired in real time. When detecting a recording start event triggered on the video acquisition page, the terminal may start to record the video data for the picture acquired in real time, and obtain the recorded video data until a recording end event is triggered on the video acquisition page. The emoticon displayed in a translucent manner is merely used for guiding recording of video data, and the video data obtained after the recording ends does not include the emoticon displayed in a translucent manner.

In an embodiment, step S606 may include displaying a text of an emoticon corresponding to the emoticon message in an original form on the video acquisition page, and displaying content other than the text of the emoticon corresponding to the emoticon message in a translucent manner on the video acquisition page. That is, the text is displayed on the video acquisition page in a non-transparent manner. Accordingly, step S608 may include displaying a superimposed image of a picture acquired in real time, the text displayed in the original form, and the content displayed in a translucent manner in the emoticon.

In an embodiment, when the emoticon corresponding to the emoticon message is a static emoticon, the static emoticon is superimposed as the foreground on the picture acquired in real time in a translucent manner. When the emoticon corresponding to the emoticon message is an animated emoticon, the animated emoticon is cyclically played as a foreground on the picture acquired in real time in a translucent manner.

Figure 7:
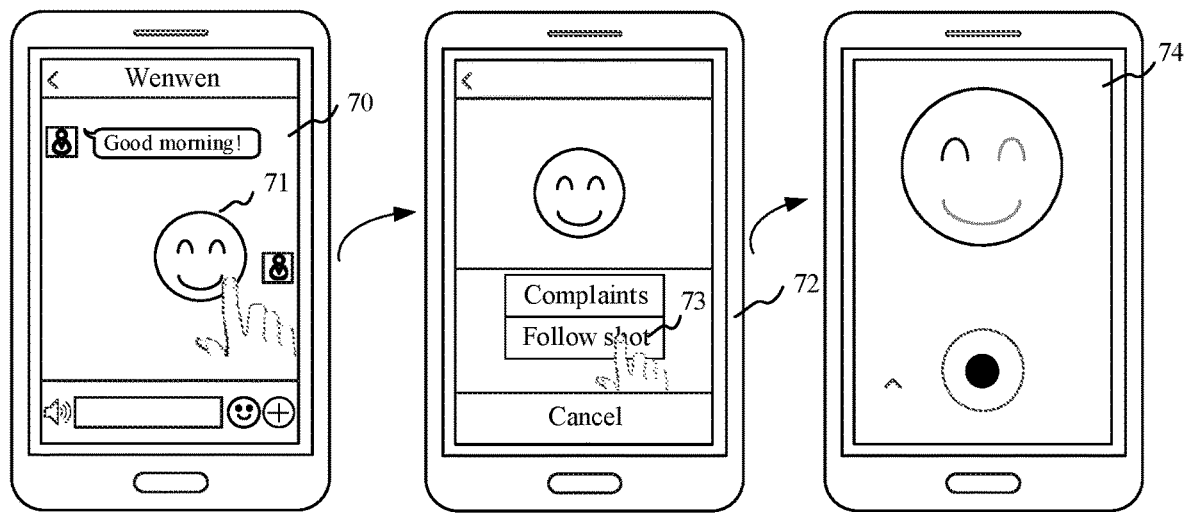
FIG. 7 is a schematic diagram of an interface of performing a follow shot on an emoticon message on a chat page according to an embodiment.

FIG. 7 is a schematic diagram of an interface of performing a follow shot on an emoticon message on a chat page according to an embodiment. In FIG. 7, the user may tap an emoticon message 71 on a chat page 70 to display a details menu 72 corresponding to an emoticon in the emoticon message. Next, the user taps a "follow shot" option 73 in the details menu 72, to trigger a jump from the chat page 70 to a video acquisition page 74 in which video data may be acquired.

S208: Obtain an edit operation for the video data.

The edit operation is an operation for further processing the recorded video data. The terminal may display a video cover of the recorded video data on the video acquisition page and display edit icons corresponding to edit operations, and obtain the edit operations triggered by the user for the recorded video data through the edit icons. The edit operation includes a background removal operation for removing a background in the video data, an acceleration operation for accelerating the playback of the video data, an emoticon addition operation for adding an additional emoticon to the video data, a text addition operation for adding an text to the video data, and the like. The emoticon addition operation may be, for example, an emoticon attachment operation, and the text addition operation may be, for example, a caption attachment operation.

Figure 8:
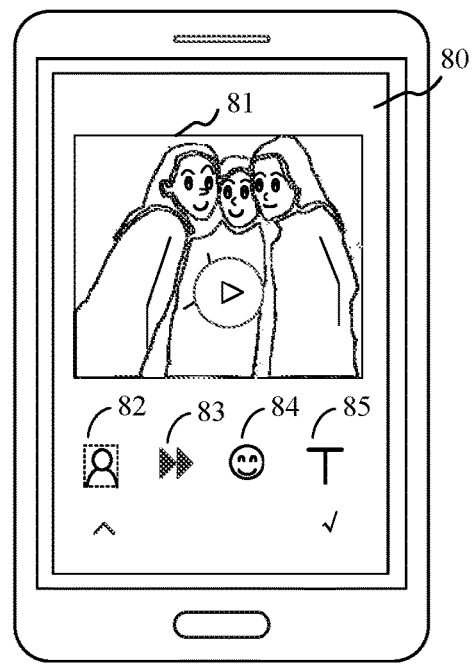
FIG. 8 is a schematic diagram of an interface in which an edit icon is displayed on a video acquisition page according to an embodiment.

FIG. 8 is a schematic diagram of displaying an edit icon on a video acquisition page according to an embodiment. Referring to FIG. 8, a video cover 81 of the recorded video data is displayed on a video acquisition page 80, and an edit operation may be performed on the video data by the user on the video acquisition page 80 by using a background removal icon 82, a playback accelerating icon 83, an emoticon attachment icon 84 or a caption attachment icon 85.

S210: Process video frames in the video data according to the edit operation to synthesize an animated emoticon.

The video data includes a plurality of video frames. The terminal may correspondingly process each video frame in the video data according to the obtained editing operation for the video data, and then synthesize the processed video frames to obtain the dynamic emoticon. A file format of the dynamic emoticon obtained after the synthesis may be GIF.

However, the file format of the dynamic emoticon is not limited thereto. The terminal may synthesize the processed video frames to obtain the animated emoticon when detecting a synthesis confirmation operation triggered by the user, or may synthesize the processed video frames to obtain the animated emoticon after the edit operation is completed.

In an embodiment, the animated emoticon generation method may further include directly synthesizing the video frames in the acquired video data to obtain the animated emoticon in a case that the edit operation for the video data is not obtained and a synthesis confirmation operation is detected.

Specifically, if the terminal does not detect the edit operation triggered by the user for the video data on the video acquisition page, and detects the synthesis confirmation operation triggered by the user for the video data on the page, the terminal may directly encode the video frames in the acquired video data according to an encoding scheme corresponding to the file format of the animated emoticon, and synthesize the encoded video frames to obtain the animated emoticon.

In an embodiment, the animated emoticon generation method further includes: detecting the transparency of pixels included in the video frames, obtaining translucent pixels from the included pixels according to the transparency and synthesizing the animated emoticon based on adjusting the transparency of the translucent pixels in the video frames to a non-transparent value.

The transparency of the pixels may be represented by the values of non-transparency parameters of the pixels. When the value of the non-transparency parameter is larger, it indicates that the pixel is less transparent. The value of the non-transparency parameter may be represented by using a percentage (for example, 0% to 100%), an integer (for example, 0 to 255) or a real number (for example, 0 to 1). For example, if the value of the non-transparency parameter of a pixel is 0%, the pixel is completely transparent. That is, the pixel cannot be seen. If the value of the non-transparency parameter is 100%, the pixel is completely opaque. Pixels with the value of the non-transparency parameter being between 0% and 100% may be displayed through the background, and these pixels are translucent pixels.

The generated animated emoticon has different effects when being displayed in interfaces with different backgrounds due to transparency. As a result, the animated emoticon cannot be used to express an original meaning. To avoid this problem, before synthesizing the processed video frames to obtain the animated emoticon, the terminal may detect the transparency of pixels in the video frames, and adjust the transparency of the translucent pixels in the video frames according to the non-transparent value before the terminal can synthesize the video frames to obtain the animated emoticon.

S212: Add an emoticon thumbnail corresponding to the animated emoticon to the emoticon input panel, the emoticon thumbnail being used for displaying the animated emoticon as a chat message on the chat page in a case that a selection event for the emoticon thumbnail is detected in the emoticon input panel.

The emoticon thumbnail may correspond to one emoticon. For a static emoticon, the emoticon thumbnail may be a thumbnail of the static emoticon. For an animated emoticon, a thumbnail of the first frame or the last frame of the animated emoticon may be used as the emoticon thumbnail. The emoticon thumbnail and the emoticon are correspondingly stored.

Specifically, the terminal may add, to the emoticon input panel, the emoticon thumbnail corresponding to the animated emoticon obtained by synthesizing the video frames. As such, when detecting a selection event for the emoticon thumbnail in the emoticon input panel, the terminal may send the animated emoticon corresponding to the emoticon thumbnail to the other communication party, and display the animated emoticon on the chat page of the terminal used by the user. The terminal may further perform a removal operation for any emoticon in the emoticon input panel to remove the emoticon from the emoticon input panel according to the removal operation.

Figure 9:
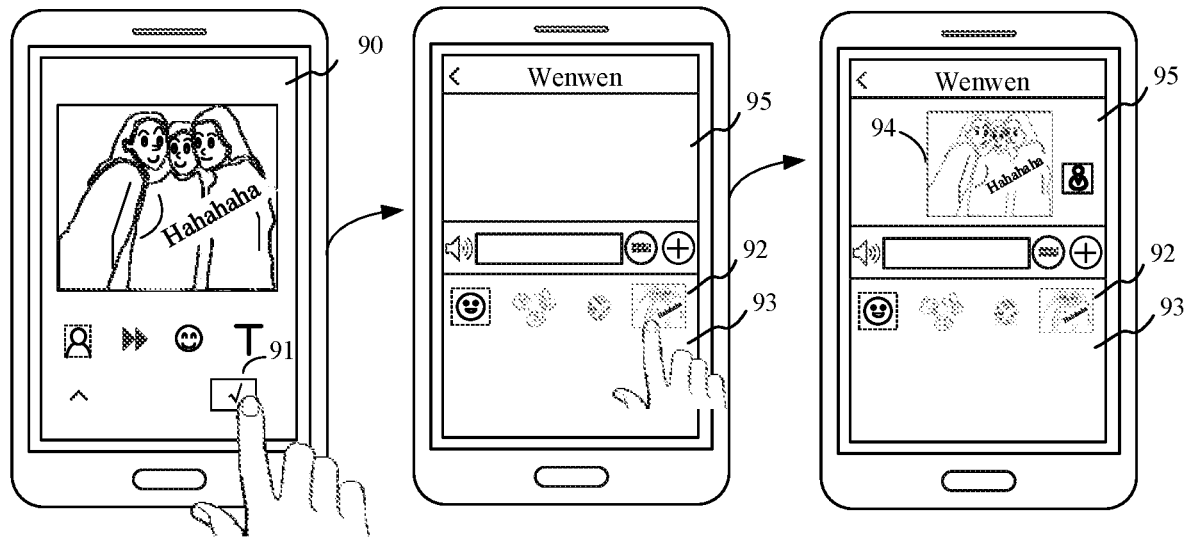
FIG. 9 is a schematic diagram of an interface in which an animated emoticon is added to an emoticon input panel according to an embodiment.

FIG. 9 is a schematic diagram of an interface in which an animated emoticon is added to an emoticon input panel according to an embodiment. After completing editing the video data on a video acquisition page 90, a user may tap on a synthesis confirmation icon 91, and then the terminal may perform the step of processing video frames in the video data according to the edit operation to synthesize an animated emoticon, and add an emoticon thumbnail 92 corresponding to the synthesized animated emoticon to an emoticon input panel 93. The user may send a corresponding animated emoticon 94 to the other communication party by taping the emoticon thumbnail 92, and the animated emoticon is displayed on a chat page 95.

In an embodiment, the terminal may obtain user information of a user, and correspondingly store the generated animated emoticon according to the user information on the server, so that the user can access the stored animated emoticon on different devices. For example, the social application may be WeChat, and the terminal may correspondingly store the generated animated emoticon to a WeChat account associated with the user. The user may pull the animated emoticon corresponding to the WeChat account from the server when logging in to the WeChat account on different devices.

Figure 10:
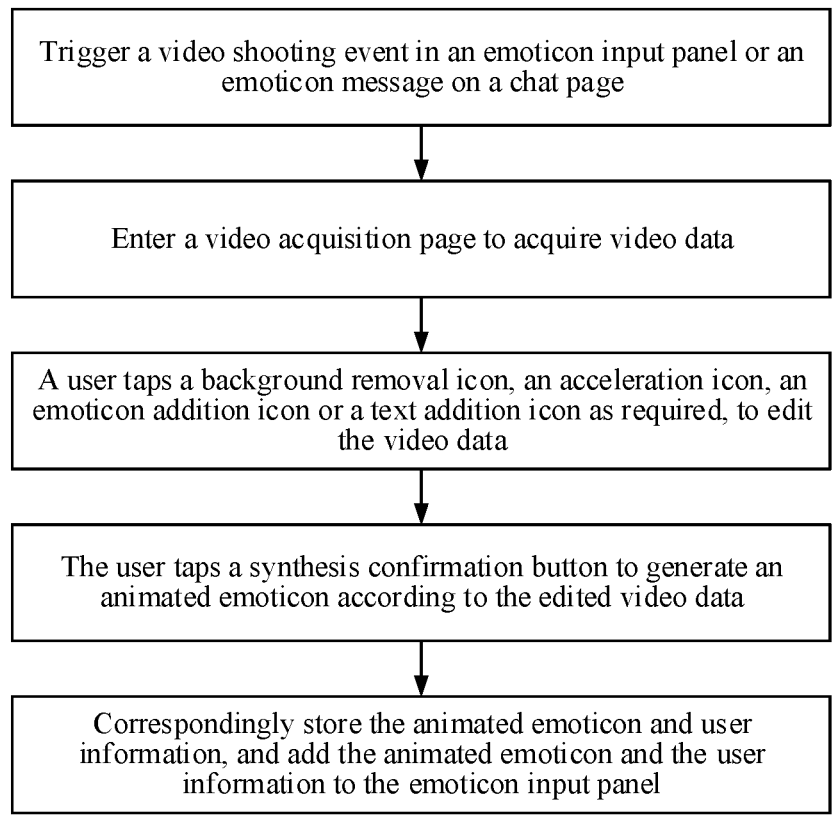
FIG. 10 is a flowchart of generating an animated emoticon according to an embodiment.

FIG. 10 is a flowchart of generating an animated emoticon according to an embodiment. First, a video shooting event is triggered in an emoticon input panel or an emoticon message on a session page. Then, a video acquisition page is displayed to acquire video data. For example, in the video acquisition page, a user may click or tap on at least one of a background removal icon, an acceleration icon, an emoticon addition icon, or a text addition icon to edit the video data. When the user clicks or taps on a synthesis confirmation button to generate a dynamic emoticon according to the edited video data, the dynamic emoticon is generated and may be correspondingly stored with user information and added to the emoticon input panel.

In the foregoing animated emoticon generation method, after the emoticon input panel on the chat page is entered, the video shooting event triggered by the user may be directly detected in the emoticon input panel, and the video data is acquired in response to the video shooting event and used as the material for generating the animated emoticon, so that it is not necessary to manually collect the material. When the edit operation for the acquired video data is obtained, the video frames in the video data may further be processed correspondingly according to the edit operation of the user to synthesize the animated emoticon. After the emoticon thumbnail corresponding to the synthesized animated emoticon is added to the emoticon input panel, the user may select the added animated emoticon from the emoticon input panel to send the animated emoticon to the other communication party. In this way, the emoticons may be personalized, and no additional tool is needed to generate the personalized emoticons, thereby greatly improving the efficiency of generating the animated emoticon.

In an embodiment, the edit operation includes a background removal operation. Specifically, the step S210 of processing video frames in the video data according to the edit operation to synthesize an animated emoticon includes: extracting facial features from the video frames according to image attributes of the video frames; obtaining contour information of a human body in the video frames according to the facial features; obtaining background regions of the video frames according to the contour information; adjusting the transparency of pixels in the background region to a transparent value; and synthesizing the adjusted video frames to obtain the animated emoticon.

When the picture acquired by the terminal in real time includes a human face, for example, a picture acquired by a user using a front-facing camera, the terminal uses video data obtained by recording the picture as material to synthesize animated emoticons to obtain personalized animated emoticons.

The background removal operation is an event triggered by the user by using a background removal icon on the video acquisition page. The terminal may perform background removal on the video frames in the video data after detecting the background removal operation. The image attribute of a video frame includes the pixel values, color component values, hue, saturation, brightness, color channels, and the like of pixels in the video frame. The facial feature is a feature that can describe a face included in the video frame.

Specifically, after detecting the background removal operation for the acquired video data, the terminal may extract, by using a trained machine learning model, the facial feature for the video frames according to the image attributes of the video frames. The extracted facial feature can express information included in the video frames. The position of a facial organ or the position of a predefined feature point is obtained from the video frames according to the extracted facial features, and the position may be represented by two-dimensional coordinates, so that the contour information of a face or human body is obtained according to the positions of a plurality of facial organs or the positions of a plurality of feature points in the video frames. The contour information includes contour information of a face shape and contour information of a body shape. In this way, the terminal may obtain the background region other than the human face and the human body in the video frames according to the contour information and adjust the transparency of pixels in the background region to a transparent value, to make the background region invisible, so that background removal is performed on the acquired video data to help synthesize the animated emoticon based on the video frames obtained after the background removal.

In this embodiment, after the background region in the video frame is obtained, the pixel values of the pixels in the background region are adjusted according to the transparent value to implement background removal on the video frames, so that the synthesized animated emoticon does not include a disorderly background. In addition, the user may implement background removal on the acquired video data by directly triggering the background removal operation on the video acquisition page. Here, it is not necessary to use an additional tool to perform background removal and then synthesize the animated emoticon, thereby improving the efficiency of generating the animated emoticon.

In an embodiment, the edit operation may include an acceleration operation. Here, the step S210 of processing video frames in the video data according to the edit operation to synthesize an animated emoticon includes: calculating a timestamp array corresponding to the video data based on an acceleration rate; traversing element values in the timestamp array; selecting, from the video data, video frames in which timestamps correspond to the element values until the traversing is finished; and synthesizing the selected video frames to obtain the animated emoticon.

The acceleration operation is an event triggered by the user by clicking or tapping on an acceleration icon on the video acquisition page. The terminal may perform acceleration on the acquired video data to obtain the accelerated animated emoticon. The timestamp array is an array formed by the timestamps in the acquired video data, and the corresponding timestamp array obtained after the acceleration operation is an array formed by several timestamps extracted from the original timestamps in the video data. A quantity of the extracted timestamp is related to an acceleration rate.

Specifically, after calculating the timestamp array of the accelerated video data, the terminal may traverse element values in the timestamp array, select the corresponding video frame from the video data according to the traversed element values, and then synthesize the selected video frames into the animated emoticon.

In an embodiment, the calculating a timestamp array corresponding to the video data includes: obtaining recording duration of the acquired video data; calculating original timestamps in video frames in the video data according to the recording duration and a frame rate of the video data; obtaining an acceleration rate corresponding to the acceleration operation; selecting original timestamps at intervals from the original timestamps according to the acceleration rate; and generating the corresponding timestamp array after the acceleration operation according to the selected timestamp.

For example, if the duration of the acquired video data is five seconds, and the frame rate of the video data is 40, that is, there are 40 video frames per second, the original timestamps corresponding to the video frames in the video data may be 0.025, 0.050, 0.075, 0.100, 0.125, 0.150, 0.175, 0.200, . . . , 4.900, 4.925, 4.950, 4.975, 5.000. Here, each number correspond to a time point at which each video frame is taken in the unit of seconds. Specifically, for example, a first frame of the video data is taken at 0.025 second, a second frame at 0.050 second and so on.

If the rate corresponding to the acceleration operation is 2, the terminal may calculate the element values in the corresponding timestamp array after the acceleration operation as follows:

0.050,0.100,0.150,0.200,0.250,0.300, . . . ,4.850, 4.900,4.950,5.000.

In an embodiment, if the duration of the acquired video data and the rate corresponding to the acceleration operation are both predefined, correspondingly, the corresponding timestamp array obtained after the corresponding acceleration operation may also be predefined, and the terminal only needs to extract the corresponding video frames from the video data according to the predefined timestamp array.

In the foregoing embodiment, the corresponding timestamp array after the acceleration operation is calculated, the corresponding video frames may be extracted from the original video data, and the extracted video frames are synthesized to obtain the animated emoticon to accelerate the playback of the acquired video data. Accordingly, the acceleration is performed on the acquired video data without an additional tool, thereby improving the efficiency of generating the animated emoticon. However, the embodiment is not limited thereto, and may include deceleration of the video data.

In an embodiment, the edit operation includes an emoticon addition operation. The step S210 of processing video frames in the video data according to the edit operation to synthesize an animated emoticon includes: displaying the emoticon input panel in response to the emoticon addition operation; obtaining an additional (or second) emoticon corresponding to an emoticon thumbnail selected from the emoticon input panel; adding an emoticon image of the additional (or second) emoticon to the video frames in the video data; and synthesizing the video frames to which the emoticon image is added to obtain the animated emoticon.

The emoticon addition operation is an event triggered by the user by clicking or tapping on an emoticon addition icon on the video acquisition page. The terminal may perform emoticon addition on the acquired video data to obtain the animated emoticon to which the additional emoticon is added. The added emoticon may be an emoticon from the emoticon input panel.

Specifically, when obtaining the emoticon addition operation for the video data, the terminal displays the emoticon input panel on the video acquisition page, obtains the additional emoticon corresponding to the emoticon thumbnail selected from the emoticon input panel by the user, and adds the additional emoticon to the video frames in the video data. The terminal may then synthesize the video frames to which the emoticon is added into the animated emoticon. Since the emoticons in the emoticon input panel include thumbnails corresponding to emoticons collected by the user according to the user's interest and thumbnails corresponding to user-defined animated emoticons, the user may add an emoticon to the acquired video data according to the user's own interests. In this way, the synthesized animated emoticon is customized according to the user's needs.

Figure 11:
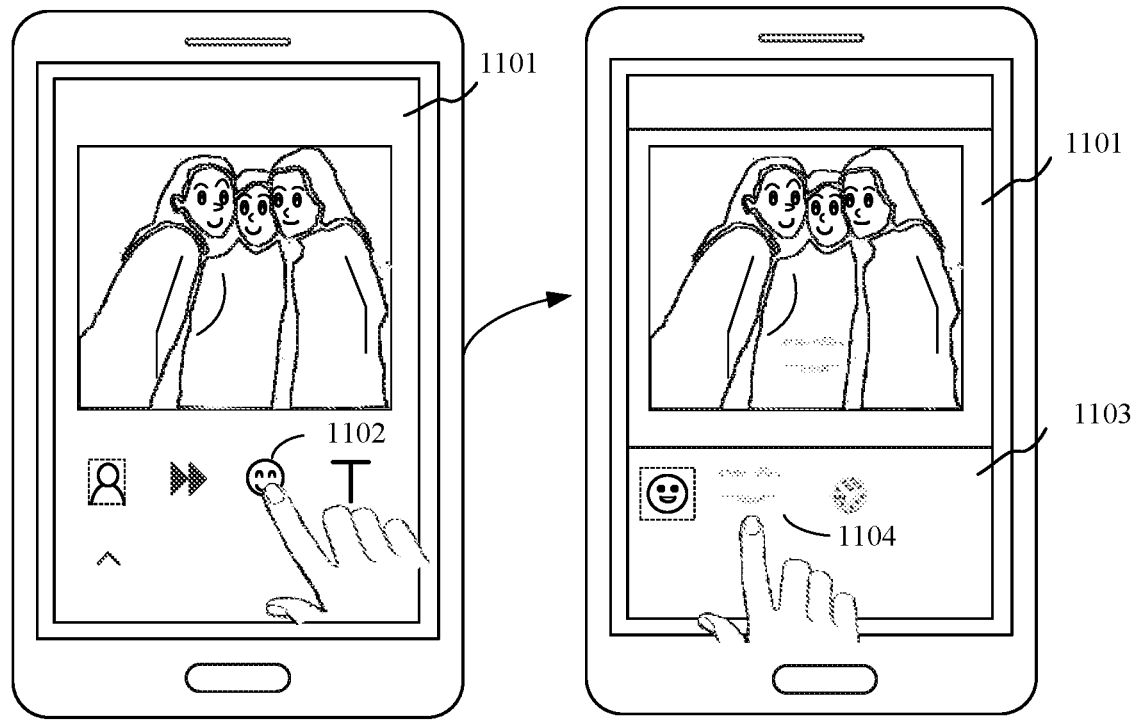
FIG. 11 is a schematic diagram of an interface in which an emoticon corresponding to a selected emoticon thumbnail is added to video data according to an embodiment.

FIG. 11 is a schematic diagram of an interface in which an additional emoticon corresponding to a selected emoticon thumbnail is added to video data according to an embodiment. Referring to FIG. 11, after detecting an emoticon addition operation triggered by tapping an emoticon addition icon 1102 by the user on a video acquisition page 1101, the terminal displays an emoticon input panel 1103 on the video acquisition page 1101. When the user taps an emoticon thumbnail 1104 in the emoticon input panel 1103, the terminal may add an emoticon corresponding to the emoticon thumbnail selected by the user to the video data.

In an embodiment, the adding an emoticon image to the video frames in the video data includes: generating a plurality of different emoticon images according to the additional emoticon; respectively mapping the plurality of different emoticon images to the video frames in the video data; and respectively adding the corresponding emoticon images to the video frames in the video data.

In an embodiment, the additional emoticon may be a static emoticon. The terminal may directly add the static emoticon to the video frames in the video data. Alternatively, the terminal may generate a plurality of emoticon images of different specifications corresponding to the additional emoticon, respectively map the plurality of emoticon images of different specifications to the video frames, and respectively add the corresponding emoticon image to the video frames. In this way, when the synthesized animated emoticon is played, the added emoticon may present an animated effect.

In an embodiment, the emoticon images of different specifications may be emoticon images having the same content as that of the additional emoticon and sizes different from that of the additional emoticon. For example, the frame rate of the acquired video data is 40. After obtaining the additional emoticon corresponding to the emoticon thumbnail selected by the user from the emoticon input panel, the terminal may generate four emoticon images of different sizes corresponding to the additional emoticon, which may include respectively a large-size emoticon image, a medium-size emoticon image, a small-size emoticon image, and an ultra-small-size emoticon image. In this case, for every second of the acquired video data, the large-size emoticon image may be added to the first frame to the fifth frame, the medium-size emoticon image may be added to the sixth frame to the tenth frame, the small-size emoticon image may be added to the $11^{th}$ frame to the $15^{th}$ frame, the ultra-small-size emoticon image may be added to the $16^{th}$ frame to the $20^{th}$ frame, the large-size emoticon image may be added to the $21^{st}$ frame to the $25^{th}$ frame, and the like. The corresponding emoticon image may be added to the video frames in the video data.

In an embodiment, the additional emoticon may be an animated emoticon. The terminal may obtain each frame of emoticon image of the additional emoticon, respectively map the plurality of different emoticon images to the video frames in the video data, and respectively add the corresponding emoticon images to the video frames in the video data. When the duration of the additional emoticon is less than total duration of the video data, the plurality of different emoticon images corresponding to the additional emoticon may be cyclically added to the video frames in the video data. When the duration of the additional emoticon is equal to the total duration of the video data, the plurality of different emoticon images corresponding to the additional emoticon may be added to the corresponding video frames one by one. When the duration of the additional emoticon is greater than the total duration of the video data, the first plurality of emoticon images may be captured from the plurality of emoticon images corresponding to the additional emoticon, or corresponding emoticon images may be selected from the plurality of emoticon images corresponding to the additional emoticon and mapped to the video frames in the video data, and the corresponding emoticon images are added to the corresponding video frames.

In the foregoing embodiment, the emoticon selected from the emoticon input panel is added to the acquired video data, to avoid a problem that the added content is relatively monotonous and content liked by the user cannot be added. For example, only some stickers can be added, and the stickers are fixed stickers designed by the developer. As a result, the generated animated emoticon may not satisfy customization needs of the user. In addition, the user may directly add the emoticon to the video data after the acquisition of the video data is completed, and it is not necessary to perform additional emoticon attachment on the acquired video data, thereby improving the efficiency of generating the animated emoticon.

In an embodiment, the edit operation includes a text addition operation, and step S210 of processing video frames in the video data according to the edit operation to synthesize an animated emoticon includes: obtaining an additional text in response to the text addition operation; adding the additional text to the video frames in the video data; and synthesizing the video frames to which the text is added to obtain the animated emoticon.

The text addition operation is an event triggered by the user by using a text addition icon on the video acquisition page. The terminal may perform text addition on the acquired video data to obtain the animated emoticon to which the text is added. In an embodiment, the obtaining an additional text includes: providing a text input box, and obtaining a text inputted in the text input box as the additional text; or obtaining speech data recorded during the acquisition of the video data, and performing speech recognition on the speech data to obtain the additional text. That is, the added text may be a text inputted by the user, or may be a text obtained by performing speech recognition on the speech data in the video data.

Specifically, when obtaining the text addition operation for the video data, the terminal displays a text input panel on the video acquisition page, obtains the text inputted in the text input box of the text input panel by the user as the additional text, and adds the obtained additional text to the video frames in the video data. The terminal may then synthesize the video frames to which the text is added into the animated emoticon. Alternatively, the terminal may perform speech recognition on the speech data in the video data when obtaining the text addition operation for the video data, and add the recognized text as the additional text to the video frames. The terminal may further display the text obtained through speech recognition in the text input panel, and the user may edit the text to ensure the accuracy of the text.

Figure 12:
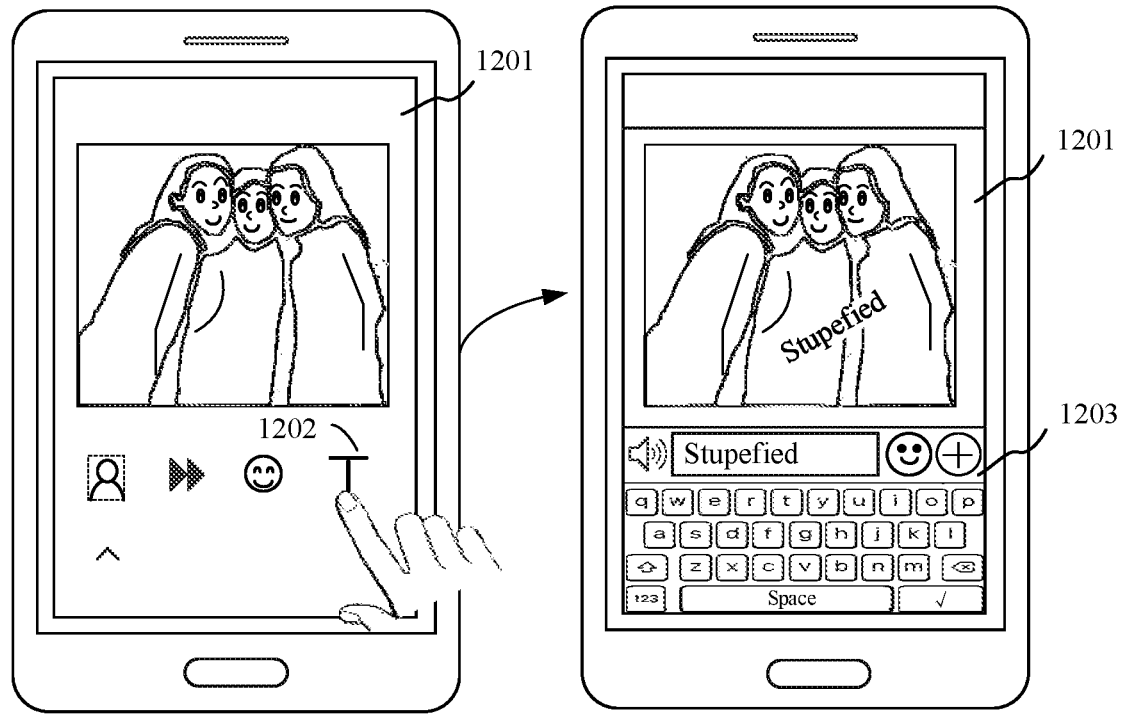
FIG. 12 is a schematic diagram of an interface in which an obtained text is added to video data according to an embodiment.

FIG. 12 is a schematic diagram of an interface in which an obtained text is added to video data according to an embodiment. Referring to FIG. 12, after detecting a text addition operation triggered by tapping a text addition icon 1202 by the user on a video acquisition page 1201, the terminal displays a text input panel 1203 on the video acquisition page 1201. The user inputs a text "Stupefied" by using the text input panel 1203 and taps "Finish (√)", so that the terminal may add the text inputted by the user to the video data.

In an embodiment, the terminal may directly add the text to the video frames in the video data. Alternatively, the terminal may generate a plurality of texts of different font sizes or different font colors according to the obtained text, respectively map the plurality of texts of different font sizes or different font colors to the video frames in the video data, and respectively add the corresponding texts to the video frames in the video data. As such, when the synthesized animated emoticon is played, the added text may present an animated effect.

For example, the frame rate of the acquired video data is 40. After obtaining the text inputted by the user in the text input panel, the terminal may generate four emoticon images of different font sizes corresponding to the inputted text, which are respectively a large-font text, a medium-font text, a small-font text, and an ultra-small-font text. In this case, for every second of the acquired video data, the large-font text may be added to the first frame to the fifth frame, the medium-font text may be added to the sixth frame to the tenth frame, the small-font text may be added to the $11^{th}$ frame to the $15^{th}$ frame, the ultra-small-font text may be added to the $16^{th}$ frame to the $20^{th}$ frame, the large-font text may be added to the $21^{st}$ frame to the $25^{th}$ frame, and the like. The corresponding text may be added to the video frames in the video data.

In the foregoing embodiment, the text input panel is displayed on the video acquisition page, and the text inputted by the user or obtained through speech recognition may be directly obtained, so that the text may be directly added to the acquired video data. The animated emoticon is synthesized without adding the text by using another tool, thereby improving the efficiency of generating the animated emoticon.

Figure 13:
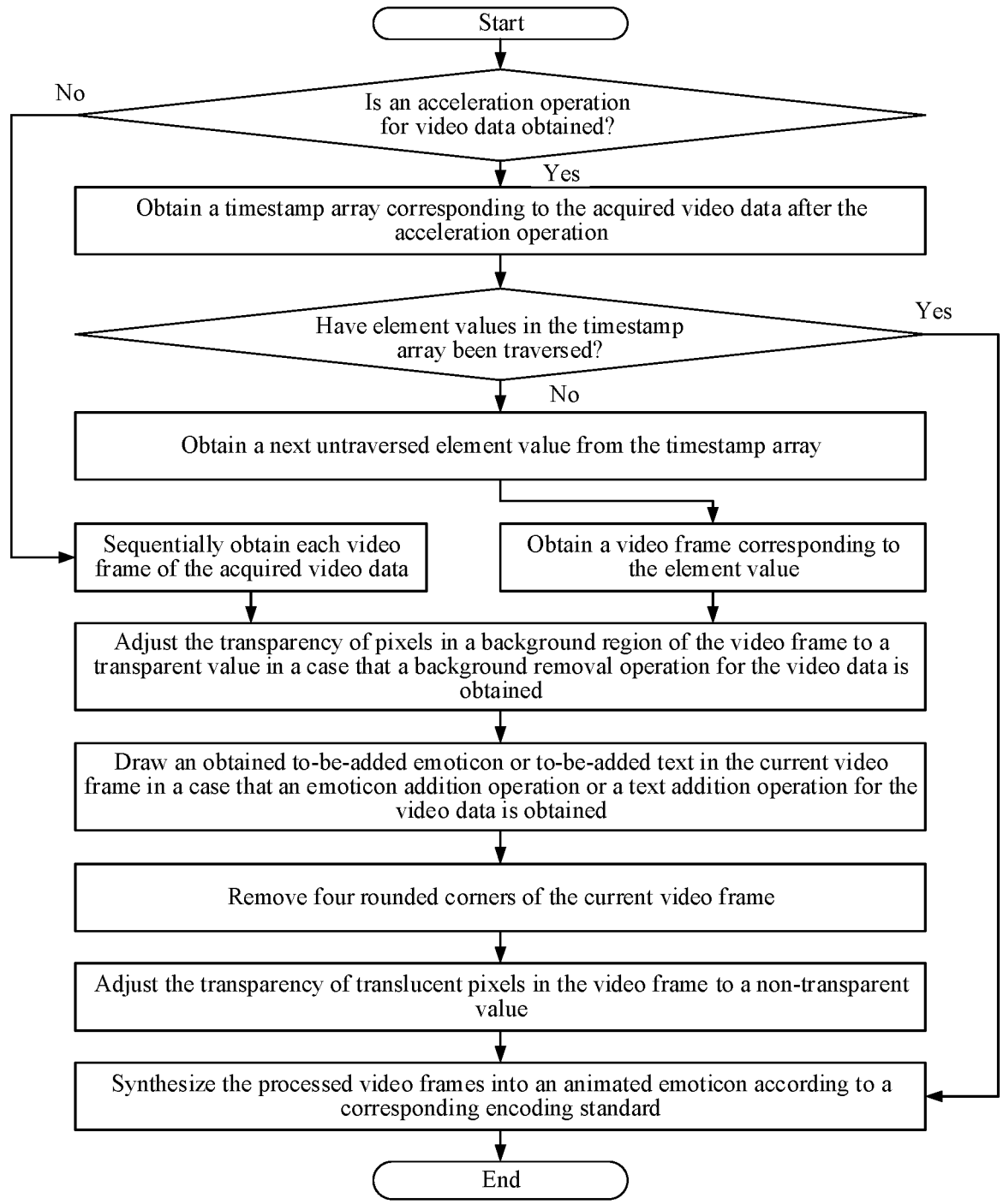
FIG. 13 is a flowchart of processing video frames in video data according to an edit operation to synthesize an animated emoticon according to an embodiment.

FIG. 13 is a flowchart of processing video frames in video data according to an edit operation to synthesize an animated emoticon according to an embodiment. Referring to FIG. 13, it is first determined whether an acceleration operation for video data is obtained. If yes, a timestamp array corresponding to the acquired video data after the acceleration operation is obtained, element values in the timestamp array are traversed, and a video frame corresponding to the element value is selected from the video data. If not, each video frame in the video data is obtained. Next, it is determined whether a background removal operation for the video data is obtained. If yes, the transparency of pixels in a background region of the selected or obtained video frame is adjusted according to a transparent value. Next, it is determined whether an emoticon addition operation or a text addition operation for the video data is obtained. If yes, an obtained an additional emoticon or text is input to the obtained video frame. Further, four rounded corners of the selected or obtained video frame may further be removed, and the transparency of translucent pixels in the video frame may be adjusted to a non-transparent value. Finally, the processed video frames are synthesized into an animated emoticon according to a corresponding encoding standard.

Figure 14:
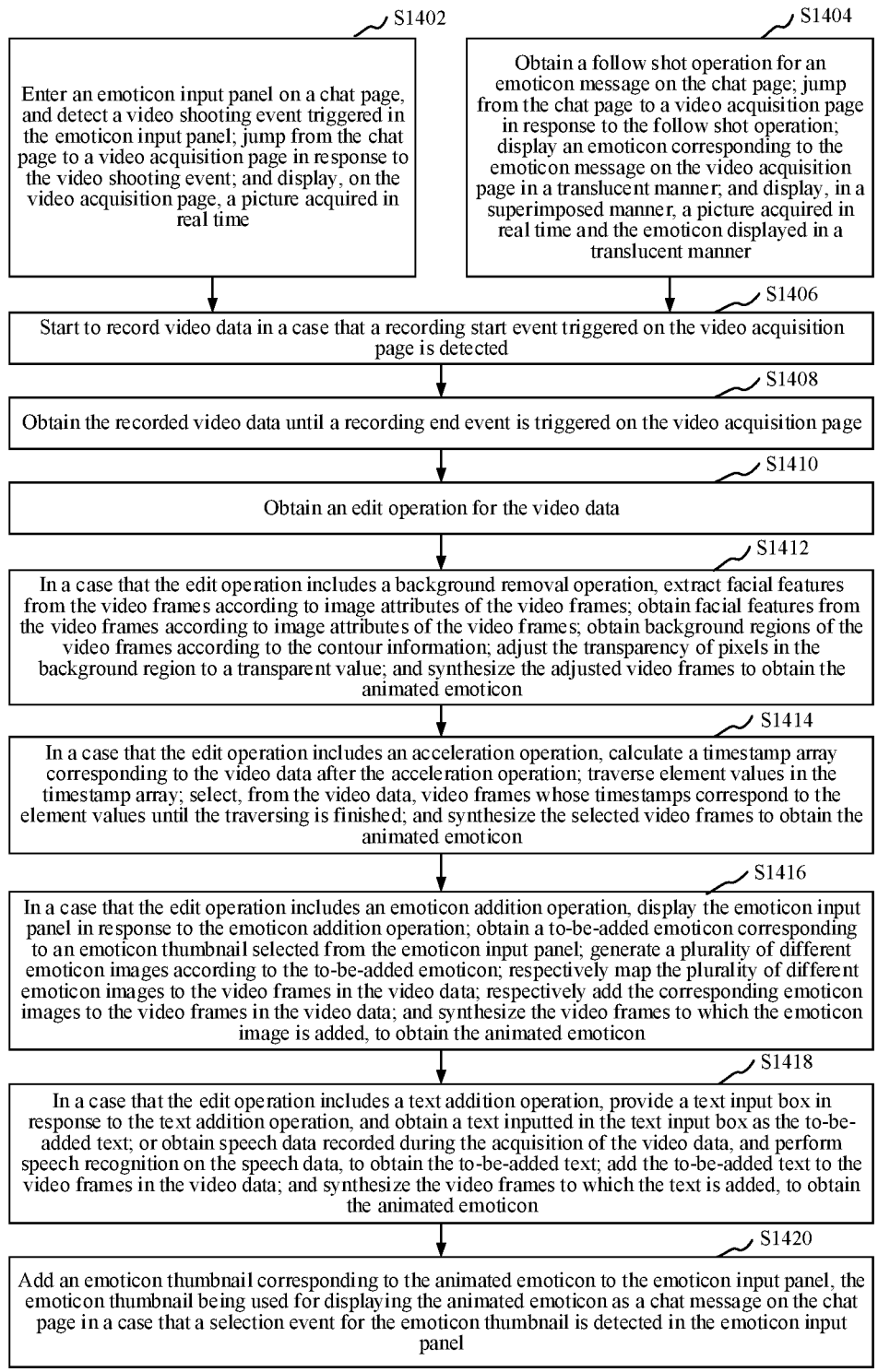
FIG. 14 is a flowchart of generating an animated emoticon according to an embodiment.

FIG. 14 is a flowchart of generating an animated emoticon according to an embodiment. Referring to FIG. 14, the method includes the following steps:

S1402: Display an emoticon input panel on a chat page, and detect a video shooting event triggered in the emoticon input panel; jump or change from the chat page to a video acquisition page in response to the video shooting event; and display, on the video acquisition page, a picture acquired in real time.

Alternatively, S1404: Obtain a follow shot operation for an emoticon message on the chat page; jump or change from the chat page to a video acquisition page in response to the follow shot operation; display an emoticon corresponding to the emoticon message on the video acquisition page in a translucent manner; and display, in a superimposed manner, a picture acquired in real time and the emoticon displayed in a translucent manner.

S1406: Start to record video data in a case that a recording start event triggered on the video acquisition page is detected.

S1408: Obtain the recorded video data until a recording end event is triggered on the video acquisition page.

S1410: Obtain an edit operation for the video data.

S1412: In a case that the edit operation includes a background removal operation, extract facial features from the video frames according to image attributes of the video frames; obtain facial features from the video frames according to image attributes of the video frames; obtain background regions of the video frames according to the contour information; adjust the transparency of pixels in the background region to a transparent value; and synthesize the adjusted video frames to obtain the animated emoticon.

S1414: In a case that the edit operation includes an acceleration operation, calculate a timestamp array corresponding to the video data after the acceleration operation; traverse element values in the timestamp array; select, from the video data, video frames whose timestamps correspond to the element values until the traversing is finished; and synthesize the selected video frames to obtain the animated emoticon.

S1416: In a case that the edit operation includes an emoticon addition operation, display the emoticon input panel in response to the emoticon addition operation; obtain an additional emoticon corresponding to an emoticon thumbnail selected from the emoticon input panel; generate a plurality of different emoticon images according to the additional emoticon; respectively map the plurality of different emoticon images to the respective video frames in the video data; add the corresponding emoticon images to the respective video frames in the video data; and synthesize the video frames to which the emoticon image is added to obtain the animated emoticon.

S1418: In a case that the edit operation includes a text addition operation, provide a text input box in response to the text addition operation, and obtain a text inputted in the text input box as the additional text; or obtain speech data recorded during the acquisition of the video data, and perform speech recognition on the speech data to obtain the additional text; add the additional text to the video frames in the video data; and synthesize the video frames to which the text is added, to obtain the animated emoticon.

S1420: Add an emoticon thumbnail corresponding to the animated emoticon to the emoticon input panel, the emoticon thumbnail being used for displaying the animated emoticon as a chat message on the chat page in a case that a selection event for the emoticon thumbnail is detected in the emoticon input panel.

In the foregoing animated emoticon generation method, after the emoticon input panel on the chat page is entered, the video shooting event triggered by the user may be directly detected in the emoticon input panel, and the video data is acquired in response to the video shooting event and used as the material for generating the animated emoticon, so that it is not necessary to manually collect the material. When the edit operation for the acquired video data is obtained, the video frames in the video data may further be processed correspondingly according to the edit operation of the user to synthesize the animated emoticon. After the emoticon thumbnail corresponding to the synthesized animated emoticon is added to the emoticon input panel, the user may select the added animated emoticon from the emoticon input panel to send the animated emoticon to the other communication party. Accordingly, the user may customize the emoticons according to the user's needs, and no additional tool may be needed, thereby greatly improving the convenience and efficiency of generating the animated emoticon.

FIG. 14 is a flowchart of an animated emoticon generation method according to an embodiment. It is to be understood that although the steps in the flowchart of FIG. 14 are sequentially displayed according to the indication of arrows, the steps are not necessarily performed sequentially in the order indicated by the arrows. Unless explicitly indicated otherwise, the sequence of the steps is not strictly limited, and the steps may be performed in other sequences. Moreover, at least some of the steps in FIG. 14 may include a plurality of sub-steps or a plurality of stages. These sub-steps or stages are not necessarily performed simultaneously, but may be performed at different moments. These sub-steps or stages are not necessarily executed sequentially, but may be performed in turn or alternately with at least some of the other steps or sub-steps or stages of other steps.

Figure 15:
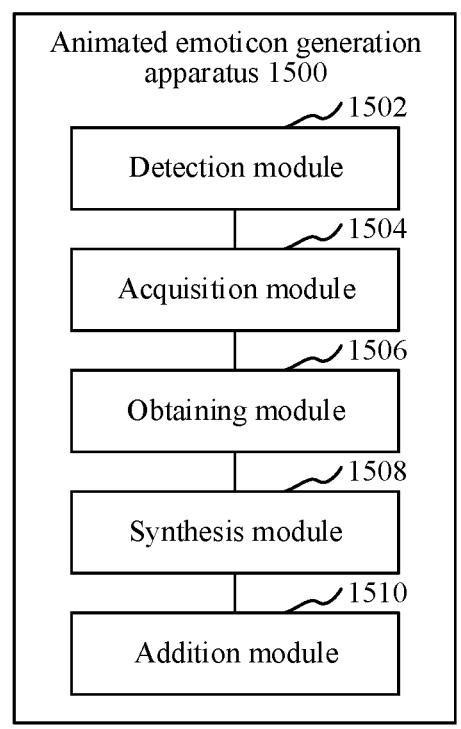
FIG. 15 is a structural block diagram of an animated emoticon generation apparatus according to an embodiment.

In an embodiment, as shown in FIG. 15, an animated emoticon generation apparatus 1500 is provided. The apparatus 1500 includes a detection module 1502, an acquisition module 1504, an obtaining module 1506, a synthesis module 1508, and an addition module 1510.

The detection module 1502 is configured to display an emoticon input panel on a chat page; and detect a video shooting event triggered in the emoticon input panel.

The acquisition module 1504 is configured to acquire video data in response to the video shooting event.

The obtaining module 1506 is configured to obtain an edit operation for the video data.

The synthesis module 1508 is configured to process video frames in the video data according to the edit operation to synthesize an animated emoticon.

The addition module 1510 is configured to add an emoticon thumbnail corresponding to the animated emoticon to the emoticon input panel, the emoticon thumbnail being used for displaying the animated emoticon as a chat message on the chat page in a case that a selection event for the emoticon thumbnail is detected in the emoticon input panel.

In an embodiment, the acquisition module 1504 includes a jump module, a display module, a recording module, and a video data obtaining module. The jump module is configured to jump from the chat page to a video acquisition page in response to the video shooting event. The display module is configured to display, on the video acquisition page, a picture acquired in real time. The recording module is configured to start to record the video data in a case that a recording start event triggered on the video acquisition page is detected. The video data obtaining module is configured to obtain the recorded video data until a recording end event is triggered on the video acquisition page.

In an embodiment, the edit operation includes a background removal operation. The synthesis module 1508 is further configured to: extract facial features from the video frames according to image attributes of the video frames; obtain facial features from the video frames according to image attributes of the video frames; obtain background regions of the video frames according to the contour information; adjust the transparency of pixels in the background region to a transparent value; and synthesize the adjusted video frames to obtain the animated emoticon.

In an embodiment, the edit operation includes an acceleration operation. The synthesis module 1508 is further configured to: calculate a timestamp array corresponding to the video data after the acceleration operation; traverse element values in the timestamp array; select, from the video data, video frames whose timestamps correspond to the element values until the traversing is finished; and synthesize the selected video frames to obtain the animated emoticon.

In an embodiment, the edit operation includes an emoticon addition operation. The synthesis module 1508 is further configured to: display the emoticon input panel in response to the emoticon addition operation; obtain an additional emoticon corresponding to an emoticon thumbnail selected from the emoticon input panel; add an emoticon image of the additional emoticon to the video frames in the video data; and synthesize the video frames to which the emoticon image is added, to obtain the animated emoticon.

In an embodiment, the synthesis module 1508 is further configured to: generate a plurality of different emoticon images according to the additional emoticon; respectively map the plurality of different emoticon images to the video frames in the video data; and respectively add the corresponding emoticon images to the video frames in the video data.

In an embodiment, the edit operation includes a text addition operation. The synthesis module 1508 further includes a text obtaining module and a text addition module. The text obtaining module is configured to obtain an additional text in response to the text addition operation. The text addition module is configured to add the additional text to the video frames in the video data. The synthesis module is further configured to synthesize the video frames to which the text is added, to obtain the animated emoticon.

In an embodiment, the text obtaining module is further configured to provide a text input box, and obtain a text inputted in the text input box as the additional text. In an embodiment, the text obtaining module is further configured to obtain speech data recorded during the acquisition of the video data, and perform speech recognition on the speech data, to obtain the additional text. Here, the text obtaining module may be configured to access a microphone to collect speech information.

In an embodiment, the animated emoticon generation apparatus 1500 further includes a transparency adjusting module. The transparency adjusting module is configured to: detect the transparency of pixels included in the video frames; obtain translucent pixels from the included pixels according to the transparency; and synthesize the animated emoticon after adjusting the transparency of the translucent pixels in the video frames according to a non-transparent value.

In an embodiment, the animated emoticon generation apparatus 1500 further includes a follow shot module. The follow shot module is configured to: obtain a follow shot operation for an emoticon message on the chat page; jump from the chat page to a video acquisition page in response to the follow shot operation; display an emoticon corresponding to the emoticon message on the video acquisition page in a translucent manner; and display, in a superimposed manner, a picture acquired in real time and the emoticon displayed in a translucent manner.

In an embodiment, the synthesis module 1508 is further configured to directly synthesize the video frames in the acquired video data, to obtain the animated emoticon in a case that the edit operation for the video data is not obtained and a synthesis confirmation operation is detected.

In the foregoing dynamic emoticon generation apparatus 1500, after the emoticon input panel on the session page is entered, the video shooting event triggered by the user may be directly detected in the emoticon input panel, and the video data is acquired in response to the video shooting event as the material for generating the dynamic emoticon without a need to collect the extra material by the user. When the edit operation for the acquired video data is obtained, the video frames in the video data may further be processed correspondingly according to the edit operation of the user to synthesize the animated emoticon. After the emoticon thumbnail corresponding to the synthesized animated emoticon is added to the emoticon input panel, the user may select the added animated emoticon from the emoticon input panel to send the animated emoticon to the other communication party. Accordingly, the user may conveniently customize the emoticons, and no additional tool may be needed to do so, thereby greatly improving the efficiency of generating the animated emoticon.

Figure 16:
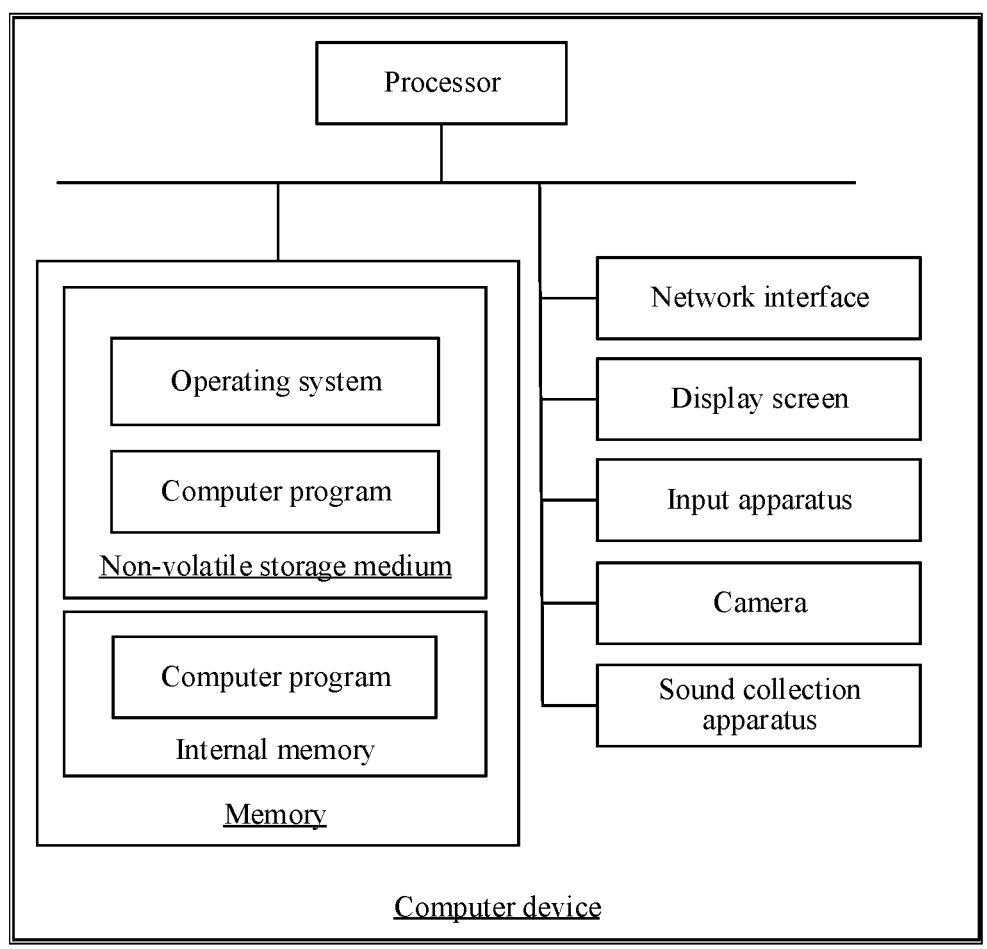
FIG. 16 is a structural block diagram of a computer device according to an embodiment.

FIG. 16 is a diagram of the internal structure of a computer device according to an embodiment. The computer device may be the terminal 110 in FIG. 1. As shown in FIG. 16, the computer device includes a processor, a memory, a network interface, an input apparatus, and a display screen that are connected by a system bus. The memory includes a non-volatile storage medium and an internal memory. The non-volatile storage medium of the computer device stores an operating system, and may store a computer program. The computer program, when executed by the processor, may cause the processor to implement the animated emoticon generation method according to various embodiments described above. The internal memory may also store a computer program. The computer program, when executed by the processor, may cause the processor to perform the animated emoticon generation method according to various embodiments described above. The display screen of the computer device may be a liquid crystal display screen or an electronic ink display screen. The input apparatus of the computer device may be a touch layer covering the display screen, or may be a key, a trackball or a touchpad disposed on a housing of the computer device or may be an external keyboard, touchpad, mouse or the like. The camera of the computer device may be a front-facing camera or a rear-facing camera, and the sound collection apparatus of the computer device may be a microphone.

A person skilled in the art may understand that the structure shown in FIG. 16 is only an example block diagram of a partial structure related to the embodiments of the disclosure, and does not constitute a limitation to the computer device to which the solution of the disclosure is applied. Specifically, the computer device may include more or fewer components than those shown in the figure, or some components may be combined, or a different component deployment may be used.

In an embodiment, the animated emoticon generation apparatus 1500 provided in this application may be implemented in the form of a computer program, and the computer program may run on the computer device shown in FIG. 16. The memory of the computer device may store program modules or code forming the animated emoticon generation apparatus 1500, for example, the detection module 1502, the acquisition module 1504, the obtaining module 1506, the synthesis module 1508, and the addition module 1510 shown in FIG. 15. The computer program formed by the program modules causes the processor to perform the steps in the animated emoticon generation method in the embodiments of the disclosure.

For example, the computer device shown in FIG. 16 may perform step S202 and step S204 by using the detection module 1502 in the animated emoticon generation apparatus 1500 shown in FIG. 15. The computer device may perform step S206 by using the acquisition module 1504. The computer device may perform step S208 by using the obtaining module 1506. The computer device may perform step S210 by using the synthesis module 1508. The computer device may perform step S212 by using the addition module 1510.

In an embodiment, a computer device is provided, including a memory and a processor, the memory storing a computer program, the computer program, when executed by the processor, causing the processor to perform the steps of the foregoing animated emoticon generation method. The steps of the animated emoticon generation method herein may be the steps of the animated emoticon generation method in the foregoing embodiments.

In an embodiment, a computer-readable storage medium is provided, storing a computer program, the computer program, when executed by a processor, causing the processor to perform the steps of the foregoing animated emoticon generation method. The steps of the animated emoticon generation method herein may be the steps of the animated emoticon generation method in the foregoing embodiments.

A person of ordinary skill in the art may understand that all or some of the foregoing embodiments may be implemented by a computer program instructing relevant hardware. The program may be stored in a non-volatile computer-readable storage medium. When the program is executed, the procedures of the foregoing method embodiments may be implemented. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an illustration instead of a limitation, the RAM is available in a plurality of forms, such as a static RAM (SRAM), an animated RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus animated RAM (DRDRAM), and a Rambus animated RAM (RDRAM).

The technical features in the embodiments may be randomly combined. For concise description, not all possible combinations of the technical features in the embodiment are described. However, all the combinations of the technical features shall be considered as falling within the scope of the disclosure provided that they do not conflict with each other.

The foregoing embodiments only describe some embodiments of the disclosure and are described in detail, but the embodiments are not to be construed as a limitation to the patent scope of the disclosure. A person of ordinary skill in the art may make modification, substitution and improvements without departing from the scope of the disclosure, which such modification, substitution and improvements shall fall within the protection scope of the disclosure.

What is claimed is:

1. An animated emoticon generation method, performed by a computer device, the method comprising:
    displaying an emoticon input panel on a chat window displaying chat messages;
    acquiring video data in response to detecting a video shooting event from the emoticon input panel on the chat window;
    while acquiring the video data and on a window other than the chat window, translucently superimposing a display of real-time images from the video data with a display of an emoticon;
    synthesizing an animated emoticon from the acquired video data of which the display of the real-time images from the video data were translucently superimposed with the display of the emoticon; and
    adding, alongside static emoticons, an emoticon thumbnail corresponding to the animated emoticon to an emoticon input panel on the chat window,
    wherein detecting the video shooting event comprises detecting whether the video shooting event is triggered in the emoticon input panel on which the chat messages are displayed, and
    wherein synthesizing the animated emoticon comprises adjusting pixel transparency, removing rounded corners of a video frame, and re-adjusting the pixel transparency.

2. The method according to claim 1, wherein the acquiring the video data in response to the video shooting event comprises:

switching from the chat window on which the chat messages are displayed to a video acquisition page in response to the video shooting event;

displaying, on the video acquisition page, an image acquired in real time;

recording the video data based on detecting a recording start event on the video acquisition page; and obtaining the video data until detecting a recording end event on the video acquisition page.

3. The method according to claim 1, wherein synthesizing the animated emoticon comprises:

an edit operation comprising a background removal operation, and extracting facial features for each of video frames in the video data according to an image attribute of each video frame;

obtaining contour information of a human figure in the video frames according to the facial features;

obtaining background regions of the video frames according to the contour information;

adjusting transparency of each pixel in a background region according to a transparency value; and synthesizing adjusted video frames to obtain the animated emoticon.

4. The method according to claim 1, wherein synthesizing the animated emoticon comprises:

an edit operation comprising an acceleration operation;

calculating a timestamp array corresponding to the video data based on an acceleration rate;

extracting, from the video data, video frames in the video data that correspond to the timestamp array; and synthesizing the extracted video frames to obtain the animated emoticon.

5. The method according to claim 1, wherein synthesizing the animated emoticon comprises:

an edit operation comprising an emoticon addition operation;

obtaining an additional emoticon corresponding to an additional emoticon thumbnail selected from the emoticon input panel;

adding an emoticon image of the additional emoticon to video frames in the video data; and synthesizing the video frames to which the emoticon image is added to obtain the animated emoticon.

6. The method according to claim 5, wherein the adding the emoticon image of the additional emoticon to the video frames in the video data further comprises:

generating a plurality of different emoticon images of the additional emoticon;

mapping the plurality of different emoticon images to respective ones of the video frames in the video data; and adding the corresponding plurality of emoticon images of the additional emoticon to the respective ones of the video frames in the video data.

7. The method according to claim 1, wherein synthesizing the animated emoticon comprises:

an edit operation comprising a text addition operation;

obtaining an additional text in response to the text addition operation;

adding the additional text to video frames in the video data; and synthesizing the video frames to which the additional text is added to obtain the animated emoticon.

8. The method according to claim 7, wherein the obtaining the additional text comprises any of:

displaying a text input box and obtaining the additional text input in the text input box by a user; and obtaining speech data recorded during the acquisition of the video data, and performing speech recognition on the speech data to obtain the additional text.

9. The method according to claim 1, further comprising:

detecting a transparency of a pixel in each of video frames in the video frame;

adjusting the transparency of the pixel according to a transparency value; and synthesizing the animated emoticon further based on the adjusted transparency of pixels in the video frames.

10. The method according to claim 1, further comprising:

obtaining a follow shot operation for an emoticon message on the chat window on which the chat messages are displayed;

switching from the chat window on which the chat messages are displayed to a video acquisition page in response to the follow shot operation, the video acquisition page being separate from the chat page;

displaying, on the video acquisition page, the emoticon as corresponding to the emoticon message on the video acquisition page in a translucent manner; and superimposing, on the video acquisition page, the real-time images acquired by a camera with the emoticon of the emoticon message displayed in the translucent manner.

11. The method according to claim 1, synthesizing the animated emoticon comprises, based on the an edit operation for the video data not being obtained and detecting a synthesis confirmation operation, directly synthesizing the animated emoticon according to video frames in the acquired video data.

12. A computer device for generating an animated emoticon, comprising:

at least one memory configured to store computer program code;

at least one processor configured to access the at least one memory and operate as instructed by the computer program code, the computer program code comprising:

displaying code configured to cause the at least one processor to display an emoticon input panel on a chat window displaying chat messages;

acquisition code configured to cause the at least one processor to acquire video data, in response to detecting a video shooting event from the emoticon input panel, and, while acquiring the video data and on a window other than the chat window, to translucently superimpose a display of real-time images from the video data with a display of an emoticon;

synthesis code configured to cause the at least one processor to process video frames in the video data according to an edit operation to synthesize an animated emoticon from the acquired video data of which the display of the real-time images from the video data were translucently superimposed with the display of the emoticon; and adding code configured to cause the at least one processor to add, alongside static emoticons, an emoticon thumbnail corresponding to the animated emoticon to an emoticon input panel on the chat window, wherein detecting the video shooting event comprises detecting whether the video shooting event is triggered in the emoticon input panel on which the chat messages are displayed, and wherein synthesizing the animated emoticon comprises adjusting pixel transparency, removing rounded corners of a video frame, and re-adjusting the pixel transparency.

13. The computer device according to claim 12, wherein the acquisition code is further configured to cause the at least one processor to:

switch from the chat window on which the chat messages are displayed to a video acquisition page in response to the video shooting event;

display, on the video acquisition page, an image acquired in real-time;

record the video data based on detecting a recording start event on the video acquisition page; and obtain the video data until detecting a recording end event on the video acquisition page.

14. The computer device according to claim 12, wherein an edit operation, of which synthesizing the animated emoticon is according to, comprises a background removal operation, and wherein the synthesis code is further configured to cause the at least one processor to:

extract facial features for each video frame according to an image attribute of each video frame;

obtain contour information of a face in the video frames according to the facial features;

obtain background regions of the video frames according to the contour information;

adjust transparency of each pixel in a background region according to a transparency value; and synthesize the adjusted video frames to obtain the animated emoticon.

15. The computer device according to claim 12, wherein the edit operation comprises an acceleration operation, and wherein the synthesis code is further configured to cause the at least one processor to:

calculate a timestamp array corresponding to the video data based on an acceleration rate; extract, from the video data, video frames that correspond to the timestamp array; and synthesize the extracted video frames to obtain the animated emoticon.

16. The computer device according to claim 12, wherein the edit operation comprises an emoticon addition operation, and wherein the synthesis code is further configured to cause the at least one processor to:

obtain an additional emoticon corresponding to an additional emoticon thumbnail selected from the emoticon input panel;

add an emoticon image of the additional emoticon to the video frames in the video data; and synthesize the video frames to which the emoticon image is added to obtain the animated emoticon.

17. The computer device according to claim 12, wherein the edit operation comprises a text addition operation, and wherein the synthesis code is further configured to cause the at least one processor to:

obtain an additional text in response to the text addition operation;

add the additional text to the video frames in the video data; and synthesize the video frames to which the additional text is added to obtain the animated emoticon.

18. The computer device according to claim 12, further comprising transparency adjusting code configured to cause the at least one processor to:

detect a transparency of a pixel in each of the video frames;

adjust the transparency of the pixel according to a transparency value; and synthesize the animated emoticon based on the adjusted transparency of pixels in the video frames.

19. The computer device according to claim 12, further comprising follow shot code configured to cause the at least one processor to:

obtain a follow shot operation for an emoticon message on the chat window on which the chat messages are displayed;

switch from the chat page on which the chat messages are displayed to a video acquisition page in response to the follow shot operation, the video acquisition page being separate from the chat window;

display, on the video acquisition page, the emoticon, which is corresponding to the emoticon message, on the video acquisition page in a translucent manner; and superimpose, on the video acquisition page, the real-time images acquired by a camera with the emoticon of the emoticon message displayed in the translucent manner.

20. A non-transitory computer-readable storage medium storing computer program code to cause at least one processor to:

display an emoticon input panel on a chat window displaying chat messages;

acquire video data in response to detecting a video shooting event from the emoticon input panel on the chat window;

while acquiring the video data and on a window other than the chat window, translucently superimposing a display of real-time images from the video data with a display of an emoticon;

synthesizing an animated emoticon from the acquired video data of which the display of the real-time images from the video data were translucently superimposed with the display of the emoticon; and adding, alongside static emoticons, an emoticon thumbnail corresponding to the animated emoticon to an emoticon input panel on the chat window, wherein detecting the video shooting event comprises detecting whether the video shooting event is triggered in the emoticon input panel on which the chat messages are displayed, and wherein synthesizing the animated emoticon comprises adjusting pixel transparency, removing rounded corners of a video frame, and re-adjusting the pixel transparency.

* * * * *